US006631003B1

(12) United States Patent
Hakki (10) Patent No.: US 6,631,003 B1
(45) Date of Patent: Oct. 7, 2003

(54) UNCORRELATED MICHELSON INTERFEROMETER

(75) Inventor: Basil W. Hakki, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/436,766

(22) Filed: Nov. 9, 1999

(51) Int. Cl.$^7$ .................................................. G01B 9/02
(52) U.S. Cl. ....................................... 356/477; 356/450
(58) Field of Search ................................. 356/477, 450

(56) References Cited

U.S. PATENT DOCUMENTS

| | | | |
|---|---|---|---|
| 4,759,627 A | 7/1988 | Thylen et al. | |
| 4,995,690 A | 2/1991 | Islam | |
| 5,285,507 A | 2/1994 | Van der Tol | |
| 5,305,074 A | 4/1994 | Feldman | |
| 5,317,384 A | 5/1994 | King | |
| 5,475,216 A | * 12/1995 | Danver et al. | 250/227.14 |
| 5,636,309 A | 6/1997 | Henry et al. | |
| 5,659,412 A | 8/1997 | Hakki | |
| 5,852,687 A | 12/1998 | Wickham | |
| 6,366,390 B1 | * 4/2002 | King et al. | 359/264 |

OTHER PUBLICATIONS

B.W. Hakki, *Polarization Mode Dispersion in a Single Mode Fiber*, Journal of Lightwave Technology, Oct. 1996, pp. 2202–2208.
J.A. Armstrong, *Theory of Interferometric Analysis of Laser Phase Noise*, Journal of the Optical Society of America, Aug. 1996, pp. 1024–1031.
U.S. Ser. No. 09/353,715, Hakki, Filed Jul. 14, 1999.
U.S. Ser. No. 09/353,716, Hakki, Filed Jul. 14, 1999.

* cited by examiner

*Primary Examiner*—Frank G. Font
*Assistant Examiner*—Phil Natividad
(74) *Attorney, Agent, or Firm*—Gregory J. Murgia (57) ABSTRACT

An uncorrelated Michelson interferometer is formed with single mode optical fiber. In a first embodiment, light is transmitted into an optical 3 dB coupler, and split into a transmission down a first optical fiber and transmission down a second, significantly longer second optical fiber. In the disclosed embodiment, the second optical fiber path may be several meters, and even hundreds of meters longer than that of the first fiber optic path. The light at the ends of the respective first and second fiber optic paths is reflected back into the single mode optical fiber, and coupled in the optical coupler. In the first embodiment, since the second fiber optic is relatively long, an unknown amount of rotation of the polarization would otherwise occur. Thus, a polarization controller is used to control the polarization in the longer, second optical fiber such that a maximum signal is output from the optical coupler. The interference between the reflected and coupled light signals from the two fiber optic paths is uncorrelated if the difference in path lengths $2\Delta L$ (up and back in each fiber optic path) exceeds the optical coherence length of the signal in the single mode optical fiber. In a second embodiment, the need for the polarization controller is eliminated by using polarization maintaining fiber (PMF) in both the first and second fiber optic paths, and using an optical rotator such as a Faraday $\pi/4$ rotator between the ends of the PMF fiber and the respective reflectors. Using PMF optical fiber and Faraday rotators, the return (i.e., reflected) light signal in each of the optical fibers, is orthogonal to the respective input signals. Moreover, the return light signal experiences no polarization mode delay. Thus, the polarizations of the returned (i.e., reflected) light signals in each of the first and second fiber optic paths are matched due to the use of PMF optical fiber.

13 Claims, 6 Drawing Sheets

PRIOR ART

FIG. 6

UNCORRELATED MICHELSON INTERFEROMETER

BACKGROUND OF THE INVENTION

1. Field of the Invention

This invention relates generally to Michelson interferometers. More particularly, it relates to apparatus and techniques for retrieving WDM telemetry signals and other device testing where a Mach-Zehnder interferometer is conventionally used.

2. Background of Related Art

Mach-Zehnder interferometers are known. In one conventional Mach-Zehnder device, the ends of two fibers are fused together and connected to a detector to measure output light intensity. The output light intensity is dependent on phase displacement.

Early Mach-Zehnder devices were limited in accuracy due to the inability to utilize polarized light. However, in later fiber optic Mach-Zehnder interferometers such as the commercially available Model HP 11980 from Hewlett Packard, and/or that disclosed in U.S. Pat. No. 4,759,627, polarization controllers are utilized to control the polarization of the light transmitted through the legs of the Mach-Zehnder interferometer. A phase difference between the output light waves causes a change in the output light intensity, which indicates a measure of the interference between the optical signals propagating in the two arms of the interferometer.

Fiber optic Michelson interferometers are also known. In a conventional Michelson interferometer, light is transmitted through two optical parts (e.g., single mode optical fibers), and the phase angles for the light waves in the two unequal lengths are compared. Like in Mach-Zehnder interferometers, a difference in the phase angle is used as a representation of a measurement of the quality of light propagating in the two paths.

Figure 6:
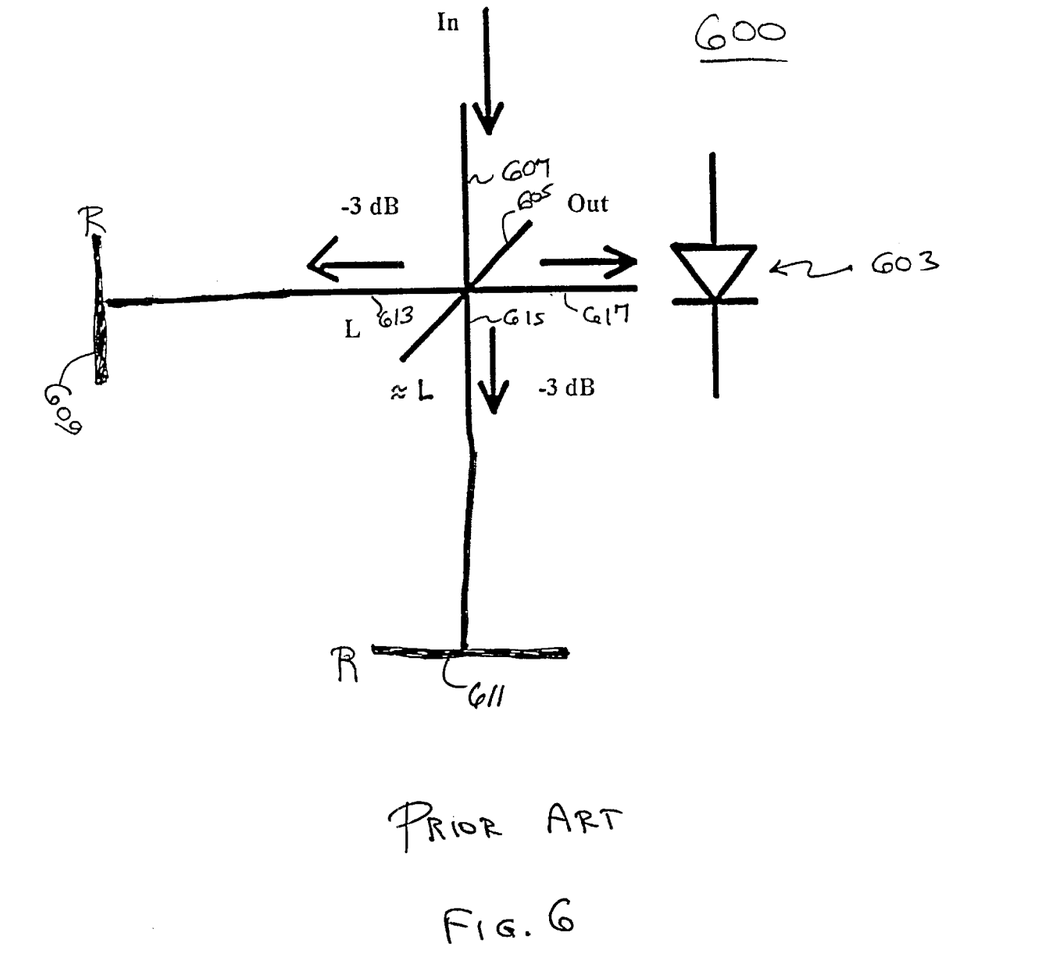
FIG. 6 shows a conventional fiber optic Michelson interferometer.

A conventional Michelson interferometer is shown in FIG. 6. (See also FIG. 1(a) of J. A. Armstrong, *Theory of Interferometric Analysis of Laser Phase Noise*, J. Optical Soc. of Am., Vol. 56, No. 8 (1966), the entirety of which is expressly incorporated herein by reference.

In particular, in FIG. 6, a fiber optic Michelson interferometer 600 is formed utilizing a 3 dB coupler 605 to split an incoming optical signal from an incoming length of single mode fiber optic cable 607 into two separate paths. A first path is formed by a first length of single mode fiber optic cable 613, and a second path is formed by a second length of single mode fiber optic cable 615. The lengths of fiber optic cable in the first path 613 and in the second path 615 are similar, but preferably the length (or other property) of the fiber optic cable in the second path 615 is influenced for measurement.

In operation, light traveling into the input path 607 is evenly split between the first path 613 and the second path 615. The light in each of the first and second paths 613, 615 travels down the single mode optical fiber until impinging upon respective reflectors 609, 611. The reflectors 609, 611 reflect 100% of the light back into the single mode fiber, effectively in the same polarization as the light was in the outgoing direction.

It is known that there is polarization mode dispersion in single mode fiber optics, e.g., as discussed in B. W. Hakki, *Polarization Mode Dispersion In A Single Mode Fiber*, J. of Lightwave Tech., Vol. 14, No. 10 (Oct. 1996), the entirety of which is explicitly incorporated herein by reference. As a result, the lengths of the fiber optic in the first and second paths 613, 615 are typically relatively short to minimize any change in the polarization due to polarization mode dispersion of the fiber optics. However, to ensure polarization to improve accuracy, polarization controllers 647, 637 are typically used in the first and second paths 613, 615, respectively.

The reflected (and polarization controlled) light from the second path 615 is coupled with the reflected (and polarization controlled) light from the first path 613 by the coupler 605, and combined into one single mode fiber optic path 617. A suitable detector 603 for detecting the amplitude of the transmitted light is placed at the end of the output path 617. In accordance with known principles, a measurement output by the detector 603 is proportional to a quantity of the light that propagates in the two paths.

The conventional fiber optic interferometers such as the known configurations of Mach-Zehnder interferometers are expensive and complicated, due largely to the need for a polarization controller.

There is a need for a less complicated and less costly configuration for a fiber optic interferometer.

SUMMARY OF THE INVENTION

In accordance with the principles of the present invention, an uncorrelated Michelson interferometer comprises an optical coupler which splits an incoming light signal into two paths. A first fiber optic path from the optical coupler is formed by a single mode optical fiber having a first length. A second fiber optic path from the optical coupler is formed by a single mode optical fiber having a second length significantly longer than the first length. The optical coupler combines reflected light from the first fiber optic path and reflected light from the second fiber optic path to cause interference therebetween.

A method of causing uncorrelated interference comprises splitting an input light signal between a first single mode optical fiber path and a second single mode optical fiber path. The second single mode optical fiber path has a significantly longer optical length than the first single mode optical fiber path. Light is reflected in an opposite direction at an end of the first single-mode optical fiber path. Light is reflected in an opposite direction at an end of the second single mode optical fiber path. The reflected light is combined to cause uncorrelated interference therebetween.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides apparatus and techniques for use of an uncorrelated Michelson interferometer as a superior alternative to the conventional Mach-Zehnder interferometer. In particular, the present invention relates to improved Mach-Zehnder interferometer apparatus and methods used, e.g., recover a telemetry signal in a WDM system. Exemplary WDM systems for which the present invention is useful include those disclosed in U.S. patent application Ser. No. 09/353,716, filed Jul. 14, 1999, entitled "Wave Division Multiplexing Channel Telemetry By Phase Modulation", by B. W. Hakki et al., and in U.S. patent application Ser. No. 09/353,715, filed Jul. 14, 1999, entitled Wave Division Multiplexing Channel Telemetry By Frequency Modulation Using a Hybrid Tunable Bragg Laser", by B. W. Hakki,("Hakki WDM Patent Applications"), the entirety of both of which are explicitly incorporated herein by reference.

Figure 1:
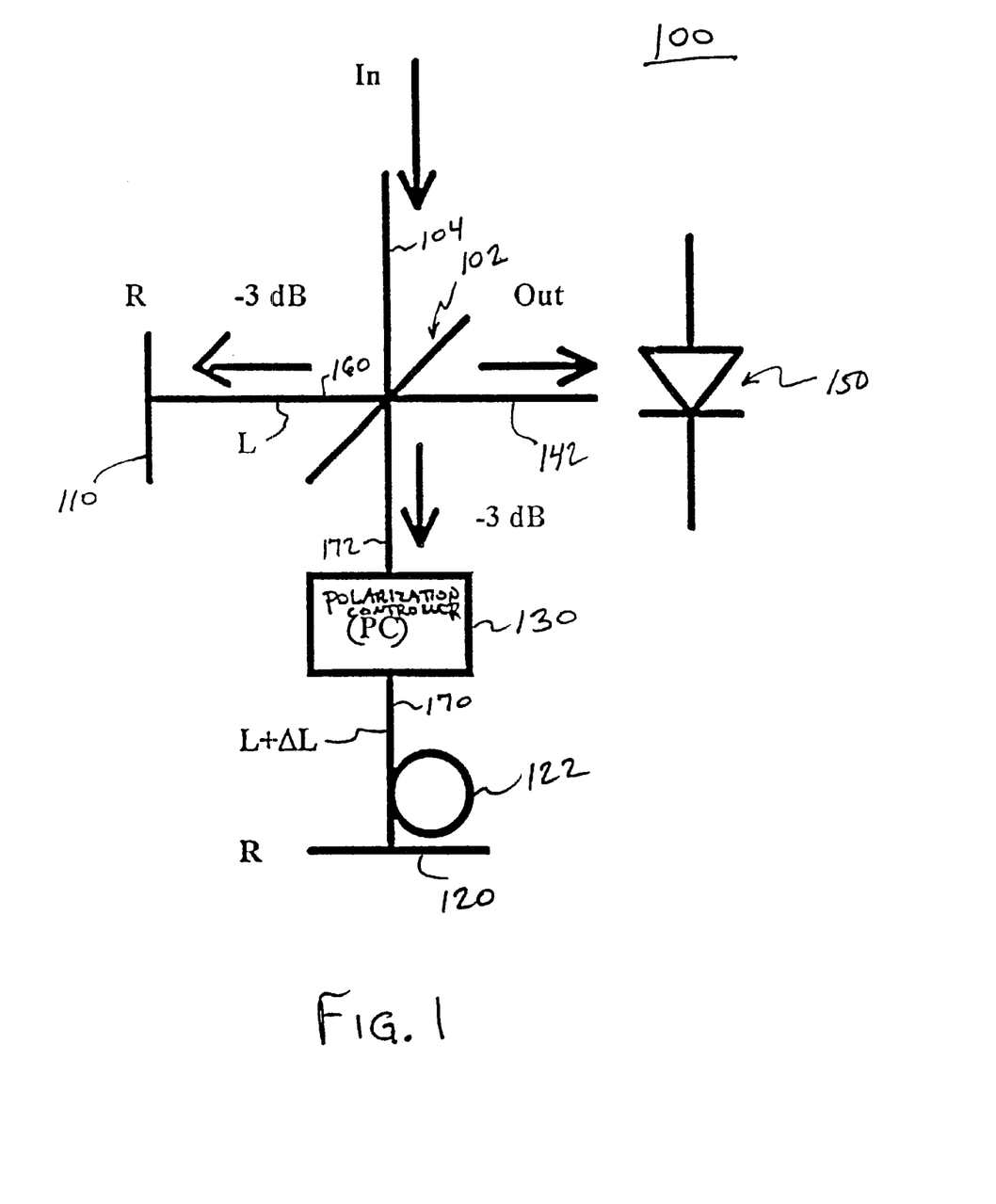
FIG. 1 shows a schematic of a first embodiment of an uncorrelated Michelson interferometer in accordance with the principles of the present invention.

FIG. 1 shows a schematic of a first embodiment of an uncorrelated Michelson interferometer in accordance with the principles of the present invention.

In particular, in FIG. 1, an uncorrelated Michelson interferometer 100 is formed with fiber optics. An input fiber optic cable 104 is input to an optical coupler 102, e.g., an optical 3 dB coupler. The optical coupler 102 splits equal powers of the input transmitted light into two separate paths 160,172.

The first fiber optic path 160 comprises a single mode fiber optic of length L, and the second fiber optic path 172, 170 comprises a polarization controller (PC) 130, and a single mode fiber optic of length L +ΔL. The length of the single mode fiber optic forming the second fiber optic path 170 is significantly longer than the single mode fiber optic forming the first fiber optic path 160, e.g., twice as long, ten times as long, etc. The second single mode fiber optic 170 is preferably many, many times longer than the first single mode fiber optic 160, e.g., orders of magnitude longer. The excessive length of the second fiber optic forming the second fiber optic path 170 is appropriately stored, e.g., by spooling around an appropriate spool 122, e.g., a 6 inch diameter spool. Of course, any appropriate apparatus can be used to accommodate the excessive length of the second fiber optic 170.

An appropriate reflector 110, 120 is placed at the end of the first fiber optic 160 and the second fiber optic 170, respectively, and ideally causes 100% of the light transmitted through the first and second fiber optics 160, 170 to be passed back through the first and second fiber optics 160, 170 in the opposite direction.

The optical coupler 102 couples the reflected light transmitted back through the first and second fiber optics 160, 170, and outputs the same through an output single mode fiber optic 142.

An appropriate detector 150 detects an amplitude of the coupled light transmitted from the output single mode fiber optic 142.

The uncorrelated Michelson interferometer 100 shown in FIG. 1 may be used in any appropriate application otherwise using, e.g., a conventional Mach-Zehnder interferometer. For instance, as disclosed in the Hakki Patent-Applications referred to herein above, the optical signal is phase modulated at some RF frequency, e.g., at 200 MHz. The RF signal itself is square wave modulated at a lower frequency, e.g., 143 kHz, that turns the RF signal on and off every T seconds, i.e., T=3.5 uS. The phase modulated optical signal is then applied to the input 104 of the uncorrelated Michelson interferometer 100 towards the optical coupler 102, as shown schematically in FIG. 1.

In operation, in the embodiment of FIG. 1, half the power (−3 dB) travels through the relatively short length L of the first fiber optic 160, and then is totally reflected by the reflector 110. In the given example, the length L of the first fiber optic 160 is approximately 1 meter. The other portion of the light power (i.e., the other half or −3 dB) travels through the longer portion L+ΔL of the second fiber optic 170, and is totally reflected by the reflector 120.

The difference in fiber lengths AL between the length of the first single mode fiber optic of the first fiber optic path 160 and the length of the second single mode fiber optic of the second fiber optic path 170 is equal to:

$$\Delta L = \frac{vT}{2} \qquad (1)$$

where v is the velocity of light in the fiber., Thus, as an example, for T=3.5 µS, the difference in fiber lengths ΔL should be about 362 meters in single mode fiber.

The two reflected signals are combined in the optical coupler 102 and output through the output port of the optical coupler 102. Self homodyne detection results when the unmodulated portion of the signal in one path beats against the modulated portion of the signal in the other path.

Furthermore, the interference between the two fiber optic paths is uncorrelated if the difference in path lengths 2ΔL (up and back in each fiber optic path) exceeds the optical coherence length of the signal in the single mode optical fiber.

For instance, for a difference in path lengths ΔL=362 meters, the linewidth of the optical signal must be greater than 90 kHz, a condition which is satisfied in most DFB semiconductor lasers.

Normally the reflected polarization in a single mode fiber is the same as the input polarization as long as the length of the fiber is relatively short, e.g., a few meters or less. Therefore there is polarization conservation in the short path of the first fiber optic path 160 of FIG. 1. However, in the relatively long second fiber optic path 170, which can be several hundred meters or more, the return polarization may be different from the input polarization.

It was observed experimentally that to maximize the strength of the interference, the return polarization of the long second fiber optic path 170 is matched in polarization by using the polarization controller 130 shown in FIG. 1.

Figure 2:
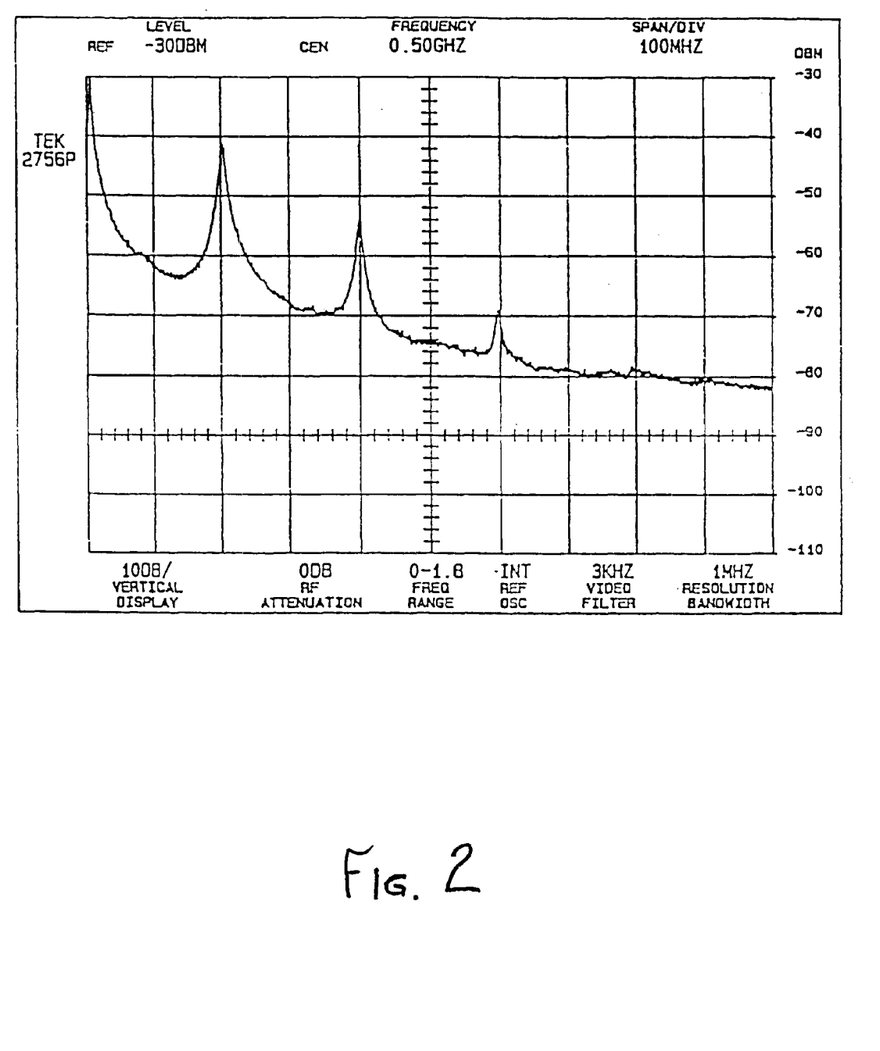
FIG. 2 shows an interference pattern obtained from an uncorrelated Michelson interferometer using a 1.537 μm DFB laser which is phase modulated by a 200 MHz RF signal, in accordance with the principles of the present invention.

FIG. 2 shows.an interference pattern obtained experimentally from an uncorrelated Michelson interferometer such as that shown in FIG. 1 using a 1.537 micrometer (µm) (1537 nanometers (nm)) DFB laser which is phase modulated by a 200 MHz RF signal, in accordance with the principles of the present invention.

In FIG. 2, the light source to the input 104 of the uncorrelated Michelson interferometer 100 is a DFB laser operating at 1537 nm. The phase modulator or phase controller 130 is driven by a 200 MHz RF signal which is square wave modulated at 143 kHz. The inferred modulation index is 0.89 radians, when the peak RF voltage is 1.26 V, i.e. Vπ=4.4 V.

Figure 3:
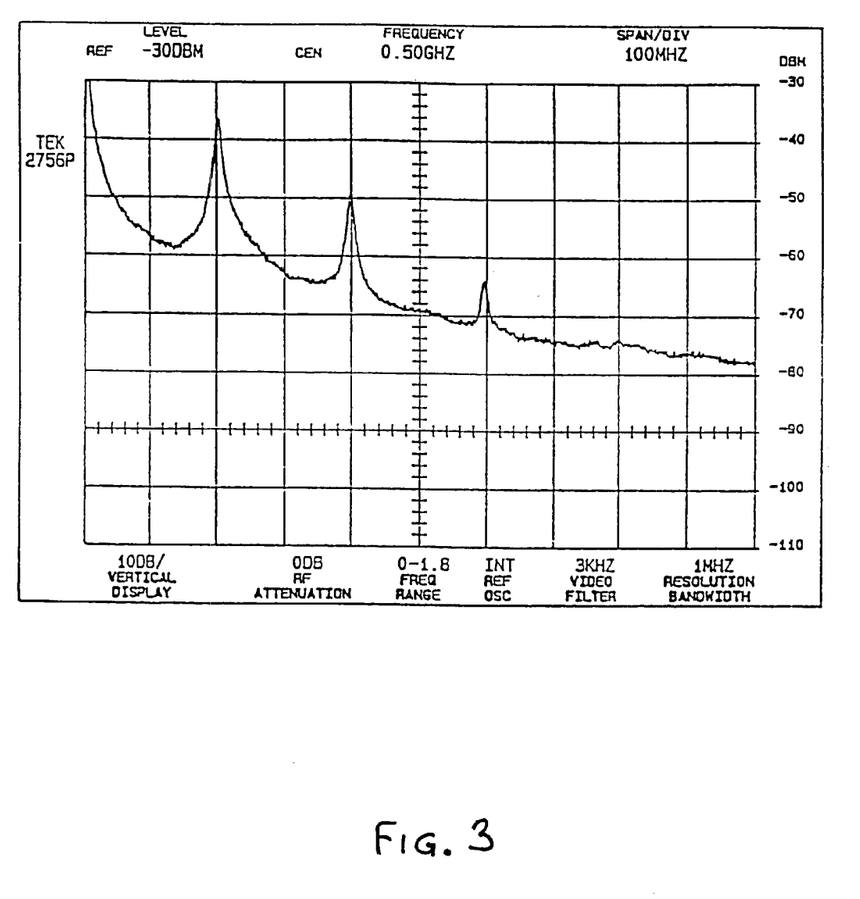
FIG. 3 shows an interference pattern for the same conditions as those of FIG. 2 except that a conventional HP11980 Mach-Zehnder interferometer is used.

FIG. 3 shows an interference pattern for the same conditions as those of FIG. 2 except that a conventional HP11980 Mach-Zehnder interferometer is used.

In particular, in comparing FIG. 3 to FIG. 2, the two interference patterns appear similar, with the signal intensity in FIG. 3 being about 5 dB greater.than that shown in FIG. 2. The relatively weaker signal in FIG. 2 is due to spurious losses in the optical coupler 102, in the polarization controller 130, and in the various connectors used to splice the components of FIG. 1 together.

While the uncorrelated Michelson interferometer 100 shown in FIG. 1 has advantages over conventional Mach- Zehnder interferometers as disclosed, costs and other issues relating to an uncorrelated Michelson interferometer can be improved upon in accordance with the principles of the present invention. For instance, FIGS. 4 and 5 show another embodiment of an uncorrelated Michelson interferometer 500 wherein the polarization controller 130 is eliminated.

Figure 4:
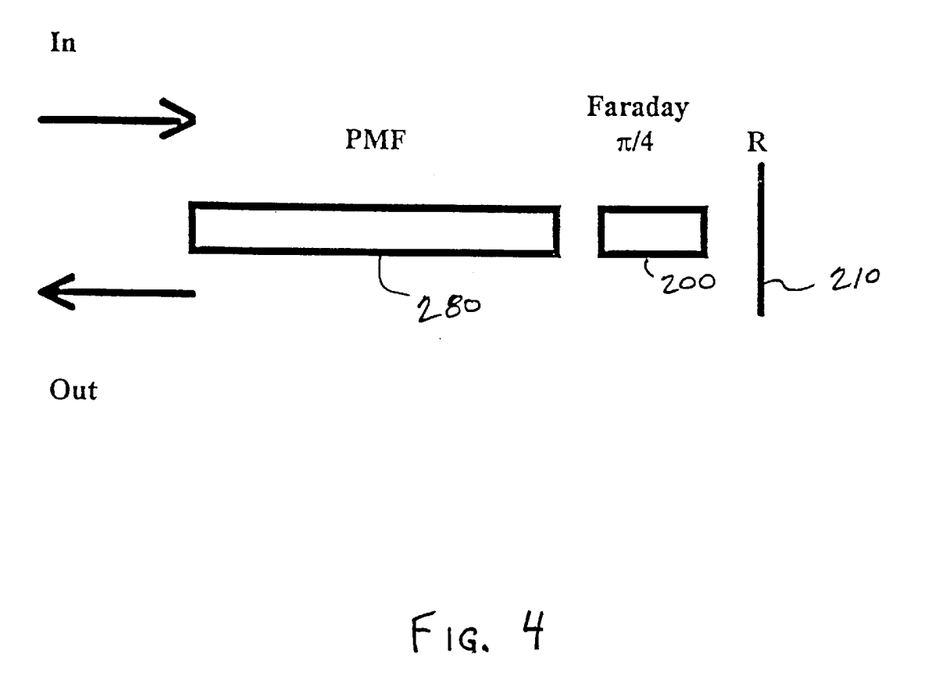
FIG. 4 shows a polarization maintaining fiber and a polarization rotating reflector that cancel the effects of polarization mode dispersion. (PMD).

In particular, FIG. 4 depicts the use of polarization maintaining fiber (PMF), and the use of a Faraday π/4 rotator 200 between the PMF fiber 280 and the reflector 210 of the uncorrelated Michelson interferometer in accordance with the principles of the present invention. The PMF fiber 280 maintains the polarization of the transmitted light, and the Faraday rotator 200 provides an appropriate rotation of the transmitted light so as to cancel the polarization dispersion in the reflected output signal from the PMF fiber 280.

Figure 5:
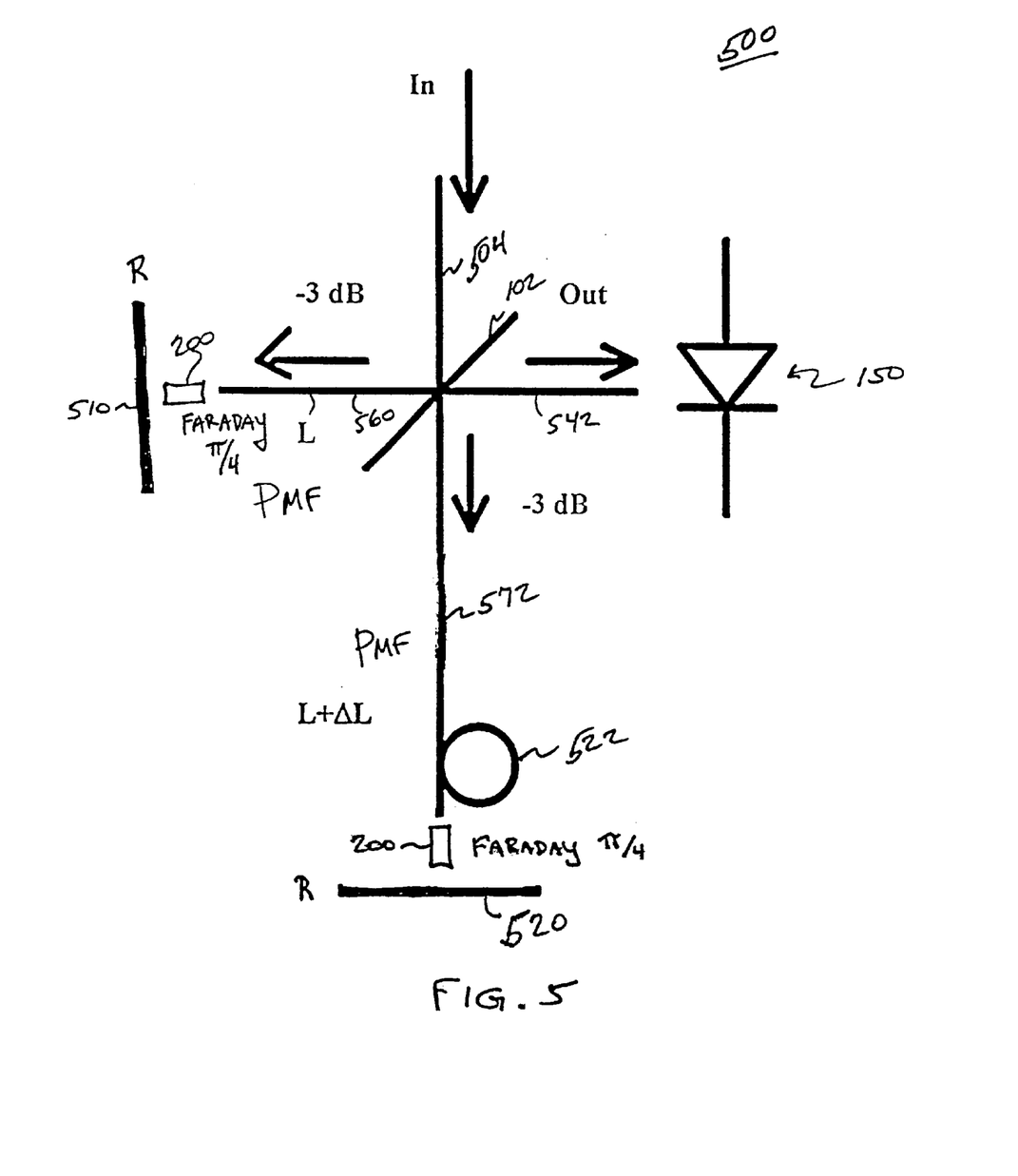
FIG. 5 shows a schematic of another embodiment of an uncorrelated Michelson interferometer implementing polarization maintaining fiber (PMF) and an optical rotator such as a Faraday rotator as shown in FIG. 4, in accordance with the principles of the present invention.

FIG. 5 shows a schematic of another embodiment of an uncorrelated Michelson interferometer implementing the use of PMF fiber and a Faraday rotator as shown in FIG. 4, in accordance with the principles of the present invention.

In particular, in FIG. 5, the polarization controller 130 otherwise shown in FIG. 1 becomes unnecessary. Instead, PMF single mode optical fiber is used to form both the first and second fiber optic paths 560, 572. Thus, each of the two fiber optic paths L 560 and L+ΔL 572 is formed with polarization maintaining fiber (PMF) single mode optical fiber, and each is terminated by an optical rotator 200, e.g., a Faraday rotator. In the disclosed embodiment, the Faraday rotators 200 provide π/4 rotation, and are followed by suitable reflectors 510, 520 as shown schematically in FIG. 5. The combination rotator/reflector cancels the effects of polarization mode dispersion (PMD) in the PMF fiber.

The polarizations of the returned (i.e., reflected) light signals in each of the first fiber optic path 560 and the second fiber optic path 572 are matched due to the use of PMF optical fiber.

The two reflected signals from both the first fiber optic path 560 and the second fiber optic path 572 are combined in the output port 542 of the optical coupler 102 (e.g., a 3 dB optical coupler), and self homodyne detection is performed.

Using PMF optical fiber and Faraday rotators 200, the return (i.e., reflected) light signal in each of the optical fibers 560, 572 is orthogonal to the respective input signals. Moreover, the return light signal experiences no polarization mode delay. This can be shown as follows.

Let the transmission matrix of the PMF be M. For a field of arbitrary orientation ⊖ relative to the axes of the PMF, the elements of the transmission matrix are given by:

$$M_{1,1} = \cos^2\theta + \sin^2\theta \exp\left(-\frac{j\omega\tau}{2}\right) \quad M_{1,2} = j\sin(2\theta)\sin\left(\frac{\omega\tau}{2}\right)$$

$$M_{2,1} = -M^*_{1,2}$$

$$M_{2,2} = M^*_{1,1}$$

where T (tau) is the polarization mode dispersion (PMD) associated with the polarization maintaining fiber (PMF) optical fiber, and w is the optical frequency.

For the Faraday rotator and reflector combinations, the matrix F associated with the double pass transmission is:

$$F_{1,1} = F_{2,2} = 0$$

and $$F_{1,2} = -F_{2,1} = -1$$

which signifies a π/2 rotation of the field.

Therefore, the transmission matrix U that represents transmission through the PMF fiber, rotation and reflection, and transmission back through the PMF fiber, is:

$$U = MFM$$

It can easily be shown from these previous Equations that:

$$U_{1,1} = U_{2,2} = 0$$

and $$U_{1,2} = -U_{2,1} = 1$$

That is, light transmission through an uncorrelated Michelson interferometer in accordance with the principles of the present invention does not experience polarization mode delay (PMD), and the returned signal is orthogonal to the input signal.

It is therefore concluded that when the first fiber optic path 560 and the second, much longer fiber optic path 572 are as shown schematically in FIG. 5, the returned polarization of light in the first fiber optic paths 560 of the uncorrelated Michelson interferometer in accordance with the principles of the present invention is matched to the returned polarization of light in the second fiber optic path 572. This provides maximum interference intensity for an arbitrary input polarization.

An uncorrelated Michelson interferometer device in accordance with the principles of the present invention finds useful applications in, e.g., WDM telemetry signal retrieval, as well as device testing as a substitute to the commercially available Mach-Zehnder interferometers.

The advantages of an uncorrelated Michelson interferometer in accordance with the principles of the present invention are, e.g., that it is potentially lower cost than conventional solutions. Moreover, by virtue of its polarization maintaining properties, an uncorrelated Michelson interferometer eliminates the need for a separate polarization controller such as that used in conventional commercially available Mach-Zehnder interferometers. This makes the Michelson interferometer more attractive in systems applications since it avoids a potentially costly and complicated polarization adjusting device.

While the invention has been described with reference to the exemplary embodiments thereof, those skilled in the art will be able to make various modifications to the described embodiments of the invention without departing from the true spirit and scope of the invention.

What is claimed is:

1. An uncorrelated Michelson interferometer, comprising:
   an optical coupler which splits an incoming light signal into two paths;
   a first fiber optic path from said optical coupler, said first fiber optic path being formed by a single mode optical fiber having a first length; and
   a second fiber optic path from said optical coupler, said second fiber optic path being formed by a single mode optical fiber having a second length significantly longer than said first length,
   wherein said optical coupler combines reflected light from said first fiber optic path and reflected light-from said second fiber optic path to cause interference therebetween, and
   wherein said second length is hundreds of meters longer than said first length.

2. An uncorrelated Michelson interferometer, comprising:
   an optical coupler which splits an incoming light signal into two paths;
   a first fiber optic path from said optical coupler, said first fiber optic path being formed by a single mode optical fiber having a first length; and
   a second fiber optic path from said optical coupler, said second fiber optic path being formed by a single mode optical fiber having a second length significantly longer than said first length;

wherein said optical coupler combines reflected light from said first fiber optic path and reflected light from said-second fiber optic path to cause interference therebetween, and wherein said first length is less than one meter, and said second length is at least an order of magnitude longer than said first length.

3. An uncorrelated Michelson interferometer, comprising:

an optical coupler which splits an incoming light signal into two paths;

a first fiber optic path from said optical coupler, said first fiber optic path being formed by a single mode optical fiber having a first length; and a second fiber optic path from said optical coupler, said second fiber optic path being formed by a single mode optical fiber having a second length significantly longer than said first length;

wherein said optical coupler combines reflected light from said first fiber optic path and reflected light from said second fiber optic path to cause interference therebetween, and wherein said first length is of an order of one meter, and said second length is at least 100 times as long as said first length.

4. An uncorrelated Michelson interferometer, comprising:

an optical coupler which splits an incoming light signal into two paths;

a first fiber optic path from said optical coupler, said first fiber optic path being formed by a single mode optical fiber having a first length; and a second fiber optic path from said optical coupler, said second fiber optic path being formed by a single mode optical fiber having a second length significantly longer than said first length;

wherein said optical coupler combines reflected light from said first fiber optic path and reflected light from said second fiber optic path to cause interference therebetween, and wherein said optical coupler splits said incoming light into each of said two paths with approximately equal amplitude.

5. An uncorrelated Michelson interferometer, comprising:

an optical coupler which splits an incoming light signal into two paths;

a first fiber optic path from said optical coupler, said first fiber optic path being formed by a single mode optical fiber having a first length; and a second fiber optic path from said optical coupler, said second fiber optic path being formed by a single mode optical fiber having a second length significantly longer than said first length;

wherein said optical coupler combines reflected light from said first fiber optic path and reflected light from said second fiber optic path to cause interference therebetween, and wherein a difference in path length between said second length and said first length exceeds an optical coherence length of an input signal to the optical coupler.

6. A method of causing uncorrelated interference, comprising:

splitting an input light signal between a first single mode optical fiber path and a second single mode optical fiber path, said second single mode optical fiber path having a significantly longer optical length than said first single mode optical fiber path;

reflecting light in an opposite direction at an end of said first single mode optical fiber path;

reflecting light in an opposite direction at an end of said second single mode optical fiber path; and combining said reflected light to cause uncorrelated interference therebetween.

7. The method of causing uncorrelated interference according to claim 6, wherein:

said single mode optical fibers are polarization maintaining fiber.

8. The method of causing uncorrelated interference according to claim 6, further comprising:

rotating said reflected light before traversing in said opposite direction in said first single mode optical fiber path; and rotating said reflected light before traversing in said opposite direction in said second single mode optical fiber path.

9. The method of causing uncorrelated interference according to claim 6, wherein:

said steps of rotating are performed with respective Faraday rotators.

10. Apparatus for causing uncorrelated interference, comprising:

means for splitting an input light signal between a first single mode optical fiber path and a second single mode optical fiber path, said second single mode optical fiber path having a significantly longer optical length than said first single mode optical fiber path;

means for reflecting light in an opposite direction at an end of said first single mode optical fiber path;

means for reflecting light in an opposite direction at an end of said second single mode optical fiber path; and means for combining said reflected light to cause uncorrelated interference therebetween.

11. The apparatus for causing uncorrelated interference according to claim 10, wherein:

said single mode optical fibers are polarization maintaining fiber.

12. The apparatus for causing uncorrelated interference according to claim 10, further comprising:

means for rotating said reflected light before traversing in said opposite direction in said first single mode optical fiber path; and means for rotating said reflected light before traversing in said opposite direction in said second single mode optical fiber path.

13. The apparatus for causing uncorrelated interference according to claim 10, wherein said means for rotating comprise:

respective Faraday rotators.

* * * * *